United States Patent [19]
Patterson

[11] 3,873,010
[45] Mar. 25, 1975

[54] DESK TOP STORAGE UNIT FOR VEHICLES

[76] Inventor: Richard J. Patterson, 2170 Century Park East, Los Angeles, Calif. 90067

[22] Filed: Apr. 16, 1973

[21] Appl. No.: 351,150

[52] U.S. Cl................... 224/42.42 A, 206/4, 220/17
[51] Int. Cl............................................. B60r 7/04
[58] Field of Search......... 224/42.42 A, 42.38, 42.4; 220/17, 9 R, 24.3; 206/19.5, 335, 4

[56] References Cited
UNITED STATES PATENTS

| | | | |
|---|---|---|---|
| 1,014,911 | 1/1912 | Sheaffer | 220/17 |
| 1,156,540 | 10/1915 | Marquis | 224/42.4 |
| 1,321,742 | 11/1919 | Hendricks | 224/42.39 |
| 1,369,367 | 2/1921 | Thomson | 220/17 |
| 1,955,610 | 4/1934 | Seipt | 220/17 |
| 2,613,804 | 10/1952 | Hughes | 220/17 |
| 2,633,180 | 3/1953 | Reed | 224/42.42 A |
| 2,678,682 | 5/1954 | Thomas | 224/42.42 A |
| 3,338,629 | 8/1967 | Drees | 224/42.42 A |

Primary Examiner—Albert J. Makay
Assistant Examiner—Kenneth Noland
Attorney, Agent, or Firm—William W. Haefliger

[57] ABSTRACT

A storage container assembly, for use in vehicles, comprises
- a. a box having an underside configured to vehicle associated support structure between left and right side passenger seating zones in the vehicle,
- b. a removable deck on the box, and
- c. hold down means attached to the box for releasably connecting the box to vehicle structure in order to hold the box underside downwardly relative to said support structure.

12 Claims, 12 Drawing Figures

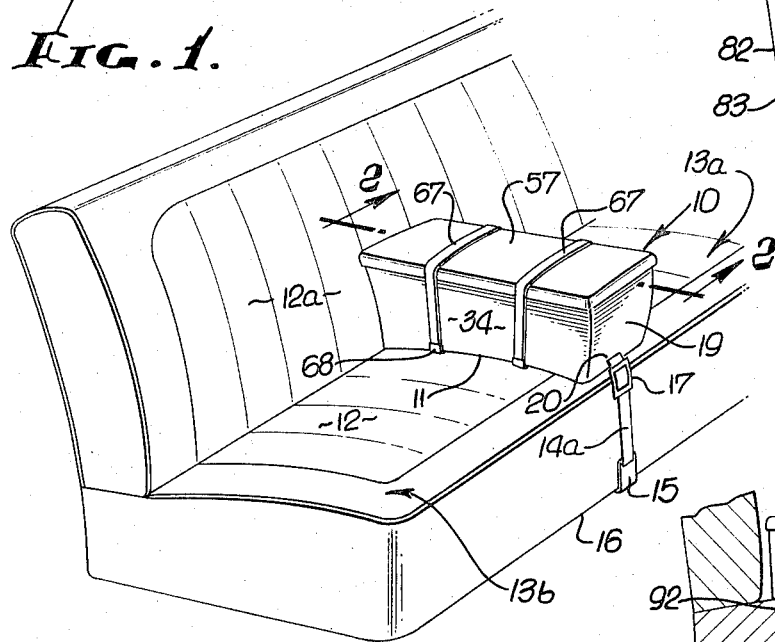
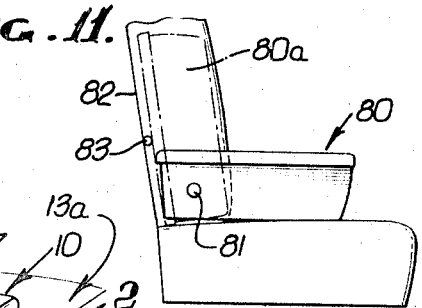
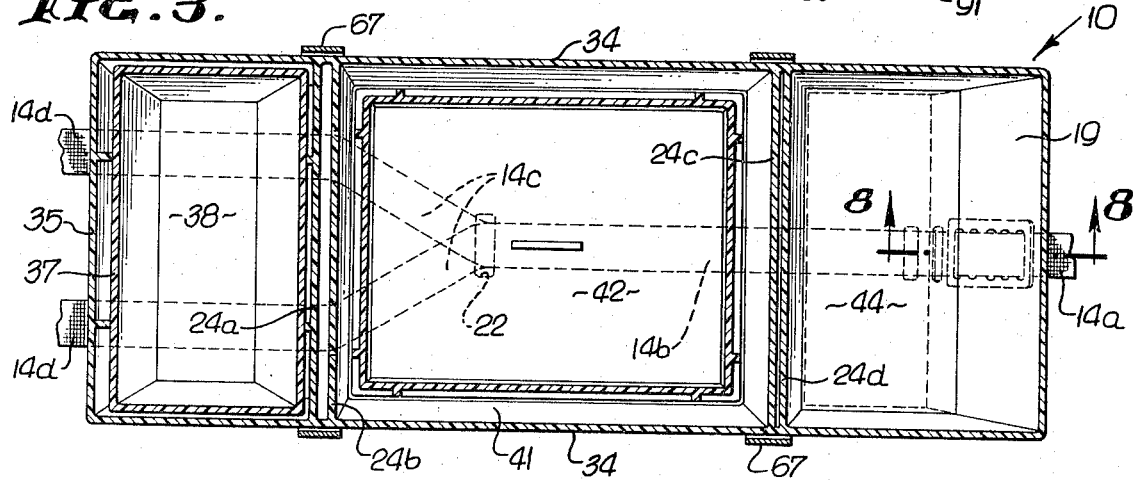
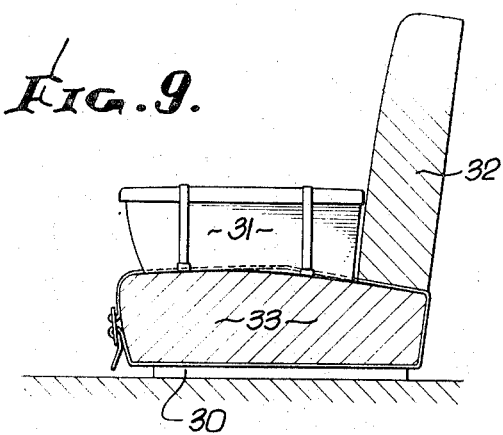
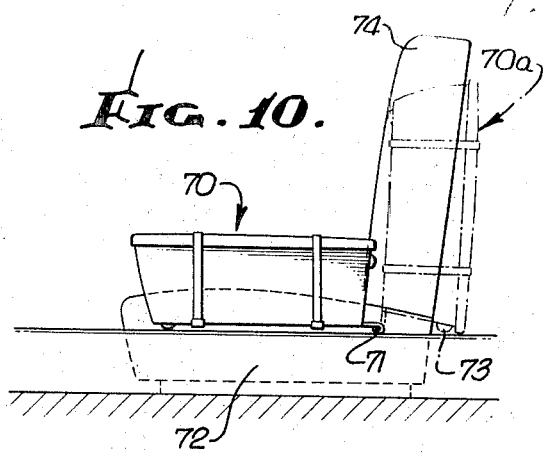

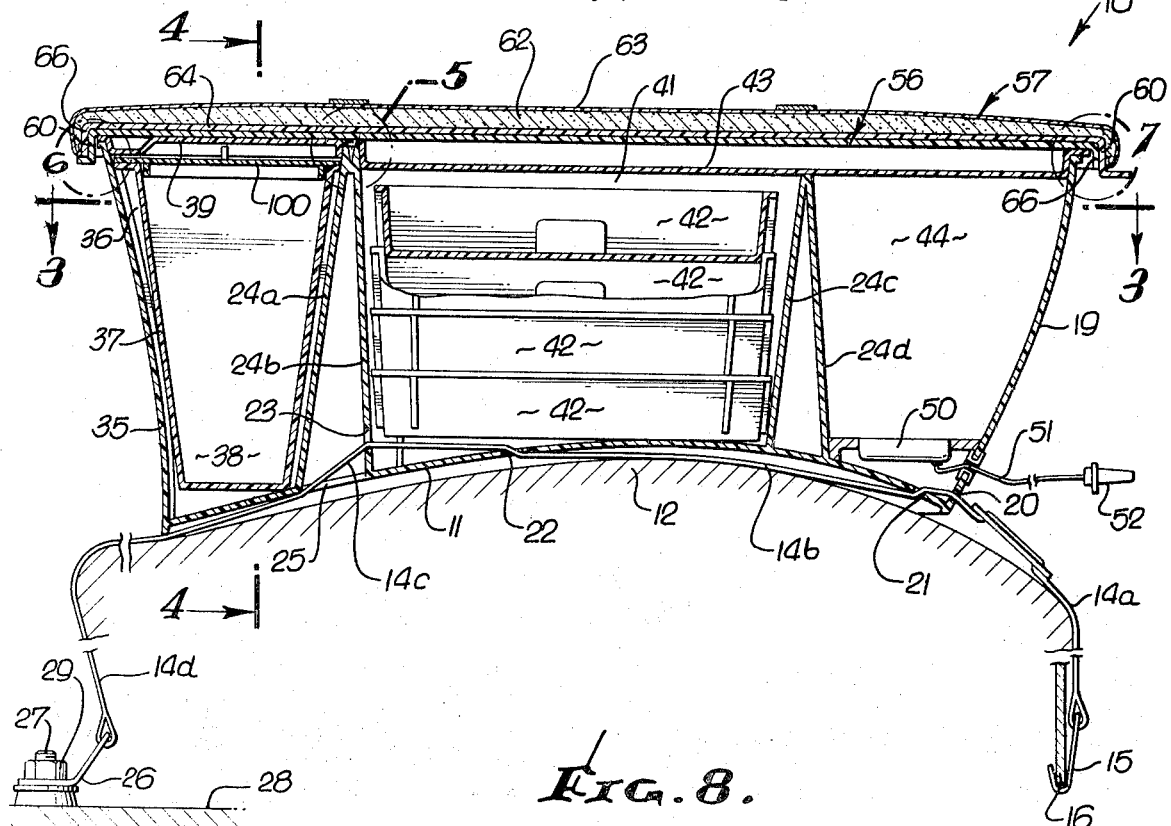
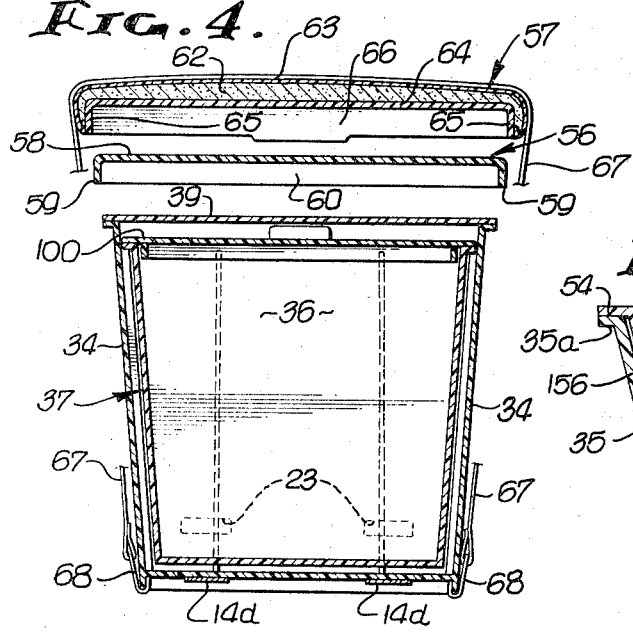
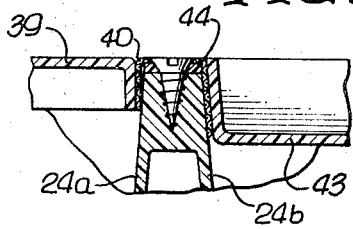
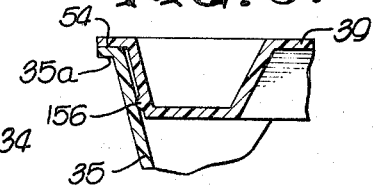
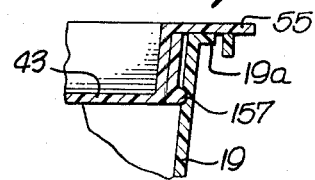

DESK TOP STORAGE UNIT FOR VEHICLES

BACKGROUND OF THE INVENTION

This invention relates generally to storage containers useful in vehicles, and more particularly concerns a removable or built-in container having multiple functions and uses while remaining accessible to the driver of the vehicle.

Considering the very large number of automobiles and trucks in current use, there is a substantial need for apparatus which will convenience vehicle drivers as well as passengers by enabling them to readily store as well as gain quick access to miscellaneous objects, including food and drink, within their vehicles. Such apparatus should preferably be within easy reach of the driver, but not interfere with his driving ability; also it should preferably serve additional functions, as will appear. No such apparatus presently exists, to my knowledge, which has the unusual combinations of structure, function and producing the surprisingly beneficial results, as now afforded by the present invention.

SUMMARY OF THE INVENTION

It is a major object of the invention to provide a storage container assembly fully meeting the above needs, as well as providing a number of additional unusual advantages, as will appear. Basically, the assembly comprises a storage box having an underside configured to vehicle support structure between left and right side passenger seating zones in the vehicle; a removable deck or writing top on the box to enable the driver, for example, to write using the box top adjacent to his driving position as a support; and hold down means attached to the box for releasably connecting same to vehicle structure in order to hold the box downwardly relative to the support structure. As will be seen, the box may typically have multiple covers directly beneath the deck and which become exposed for selective upward lifting after prior removal of the deck, the multiple covers extending over different box compartments. The latter may define hot and/or cold storage zones, or may contain trays, as will be seen.

A further object of the invention is to provide a cushioned arm rest removably fitting over the flat writing top, the arm rest normally being usable during driving, for example. Another object concerns the provision of illumination means removably carried by the box to illuminate the writing top when the cushioned arm rest is removed. An additional object is to provide the box hold down means in the form of strap structure attachable to the seat and/or to an anchor post connected with the vehicle floor, or in the form of a pivot enabling pivoting of the box between raised and lowered positions, or in the form of rod-like connections between the box and seat structure to enable movement of the box with the vehicle seat during adjustment shifting thereof.

These and other objects and advantages of the invention, as well as the details of illustrative embodiments, will be more fully understood from the following description and drawings, in which:

DRAWING DESCRIPTION

FIG. 1 is a perspective view of a vehicle seat, supporting the storage container;

FIG. 2 is an enlarged vertical elevation taken in section on lines 2—2 of FIG. 1;

FIG. 3 is a horizontal section on lines 3—3 of FIG. 2;

FIG. 4 is a vertical section on lines 4—4 of FIG. 2, showing lifted positions of the writing top and cushioned arm rest;

FIG. 5 is an enlarged fragmentary section taken as designated at 5 in FIG. 2;

FIGS. 6 and 7 are enlarged fragmentary sections taken as designated at 6 and 7 in FIG. 2;

FIG. 8 is an enlarged section on lines 8—8 of FIG. 3;

FIG. 9. is a vertical section showing a storage container, as in FIG. 2, strap connected to the vehicle seat;

FIGS. 10 and 11 are vertical elevations showing storage containers pivotally mounted to vehicle structure; and FIG. 12 is a vertical section showing a storage container connected to vehicle seat structure as by plunger attachment.

DETAILED DESCRIPTION

Referring first to FIGS. 1–4, the illustrated storage container includes a forwardly elongated box 10 the underside 11 of which is configured to vehicle associated support structure, as for example the front seat 12 of an automobile and between the left and right size passenger seating zones 13a and 13b. The box may consist of a suitable lightweight molded plastic material so as to be readily carried about, if desired, after detachment from the vehicle structure. In this regard, hold down means is attached to the box for releasable connecting same to the vehicle structure, in order to hold the box underside 11 downwardly relative to the support structure and prevent accidental shifting of the box out of position. As illustrated, the box underside 11 may have downwardly arcuate or concave shape, in vertical longitudinally forward planes, to correspond with and fit the upwardly convex seat top.

Such hold down means may with unusual advantage comprise strap mechanism and anchor connection means attached to the strap mechanism to releasably connect to a post projecting upwardly from the vehicle floor. In the example, the strap mechanism includes a front section 14a to which an anchor connection or clip 15 is attached to clip to the lower forward edge 16 of the seat, and overlapping strap sections 14b connected to section 14a by means of a buckle type strap length adjustment 17 one example of which appears in FIG. 8. Sections 14b extend through a slot 20 in the lower front wall 19 of the box, then downwardly through a slot 21 in the box bottom wall 11, and then rearwardly to re-enter the box via bottom wall slot 22. Y-shaped strap sections 14c then pass through a slot 23 in box internal partition 24b, then downwardly through slots 25 in the box bottom wall and then rearwardly to hand downwardly at 14d. Anchors 26 attached to the lower end of the strap sections 14d are releasably attached to posts 27 connected with the vehicle floor 28 and projecting upwardly as shown, nuts 29 retaining the anchors on the posts. FIG. 9 illustrates a modified strap connection extending in looping relation at 30 about the vehicle seat structure 33 to hold the box 31 down on the seat top, and also rearwardly against the seat back at 32.

Referring to FIGS. 1–4, the box 10 also includes side walls 34, rear end wall 35 shaped to fit the curved front 12a of the seat back, and internal partitions 24a, 24b and 24d. Partition 24a and rear wall 35 define a compartment 36 receiving a molded plastic receptacle 37 which may contain a cold sink 38, as for example ice or equivalent coolant to maintain beverages or other edibles in the receptacle in cooled state. A cover 39, hinged at 40, extends over the receptacle 37 and compartment 36. The receptacle itself may have a removable top cover 100.

An intermediate compartment 41 is formed between partitions 24b and 24c, and receives a series of vertically nesting trays 42, as seen in FIG. 2. Such trays may be used to carry other edibles, or miscellaneous articles, cosmetics, toiletries etc. Another cover 43, hinged at 44, extends over the compartment 41, as well as over a forward compartment 44 forward between partition 24d and front wall 19. Compartment 44 may advantageously comprise a warm or hot compartment, and contain an electrical heating element indicated at 50. An electrical cord 51 extends from the heater through front wall 19 and terminates at a plug 52 sized to fit the electric lighter receptacle in the instrument panel of the vehicle. Edibles to be kept warm may be stored in compartment 44.

Lids or covers 39 and 43 terminate at flanges 54 and 55, better seen in FIGS. 6 and 7, and seating at the upper rims 35a and 19a respectively of the rear and front walls of the box. Detents may be provided at 156 and 157 on the lids to snap into corresponding depressions in the walls, to maintain the covers in fully closed "down" position. The lid 43 is sunken between its four raised edges to seat and contain cups, dishes, etc., preventing spillage off the box.

In accordance with important aspects of the invention, a deck or writing top or panel 56 and a cushioned arm rest 57 are provided to successively seat downwardly, as appears from FIGS. 2 and 4. The deck may have a flat "writing top" panel 58 to completely cover the lids or covers, and edge flanges 59 and 60 fitting downwardly and closely about the upper extents of the box walls, as is clear from FIG. 2. Accordingly, the driver or other passenger may use the deck as a writing or work surface, as needed, without disturbing the contents of the box compartments, or the lids or covers therefor.

The cushioned arm rest 57 may be padded as seen at 62, and covered with a vinyl or other fabric or plastic sheet 63. The plastic panel 64 underlying the padding fits over and against the writing top, and has edge flanges 65 and 66 that fit closely about and downwardly adjacent the writing top flanges 59 and 60 as seen in FIGS. 2 and 4. The fit may be such as to firmly retain the arm rest in down position, for use by the driver during vehicle operation. Elastic bands or straps 67 may be stretched over the assembly, and clipped to the bottoms of the box side walls, as at 68, to positively retain the arm rest and writing-top in assembled state, as is clear from the drawings. Great structural integrity and rigidity is thereby maintained.

In the FIG. 10 modification, the box 70 has pivotal attachment at 71 to the portion 72 of the vehicle floor raised above the vehicle transmission, allowing the box to be tilted rearwardly to position 70'a, between bucket seats 74. The box then also seats at 73 on the vehicle raised floor extent. In the FIG. 11 modification, similar tilting of the box 80 is enabled by means of a pivot arm 81 projecting laterally from a seat back 82. The box then may tilt rearwardly to position 80a, at which a stop 83 projecting from the seat back arrests further pivoting. In FIG. 12, the box 90 attaches to the seat 91 via rods 92 projecting downwardly from the box and into the seat structure to engage retainers 93 concealed in such structure. If desired, the rods may have non-circular cross sections. An illumination means such as battery powered lamp 94 on a standard 95 may be attached to the box as at 96; the lamp may alternatively be plugged into the vehicle cigarette lighter socket. The lamp may be used for illuminating written material on the writing top; alternatively, a shaving mirror may be attached to the box in place of the lamp, or in addition to the lamp.

I claim:

1. A storage container assembly for use in vehicles, comprising
   a. a box having an underside configured to vehicle associated support structure between left and right side passenger seating zones in the vehicle,
   b. a readily removable deck on the box, and a cushioned arm rest removably fitting over said deck, the arm rest peripherally interfitting the deck and the deck substantially peripherally encloses the upper rim portion of the box, and
   c. hold down means attached to the box for releasably connecting the box to vehicle structure in order to hold the box underside downwardly relative to said support structure.

2. The assembly of claim 1 wherein said hold-down means includes a strap mechanism extending into the box via aperture structure therein and anchor connection means attached to said strap mechanism exteriorly of the box to releasably connect to a post projecting upwardly from the vehicle floor.

3. The assembly of claim 1 wherein said hold-down means includes a generally horizontal pivot connected to vehicle structure, and pivotally supporting the box to pivot generally horizontal and vertical positions.

4. The assembly of claim 1 wherein the box has multiple covers directly beneath said deck and which are exposed for selective upward lifting after prior removal of said deck, the deck peripherally interfitting the upper rim portion of the box and being enclosed by said arm rest.

5. The assembly of claim 1 including a hot compartment in the box beneath one of said multiple covers, and a separate cold compartment in the box beneath another of said multiple covers.

6. The combination of claim 5 including an electrically energizable heater associated with said hot compartment.

7. The combination of claim 1 including illumination means removably carried by the box to project above the level of said deck.

8. The combination of claim 5 including nesting trays carried in the box.

9. The combination of claim 8 wherein the box consists of molded plastic material and is elongated in a forward direction relative to said support structure in the form of a vehicle seat.

10. The assembly of claim 1 wherein said hold-down means includes strap mechanism attached to the box and looping about a vehicle seat to connect the box thereto.

11. The assembly of claim 1 including releasable strap means holding the arm rest downwardly on the deck.

12. The assembly of claim 1 wherein the hold-down means comprises structure projecting downwardly from the underside of the box to releasably attach the box to the supporting vehicle seat structure.

* * * * *